United States Patent [19]
Brecker

[11] 3,803,083
[45] Apr. 9, 1974

[54] NEW SYNERGISTIC ORGANOTIN MERCAPTOCARBOXYLIC ACID ESTER STABILIZERS

[75] Inventor: Lawrence Robert Brecker, Brooklyn, N.Y.

[73] Assignee: Argus Chemical Corporation, Brooklyn, N.Y.

[22] Filed: Sept. 7, 1972

[21] Appl. No.: 287,119

[52] U.S. Cl....... 260/45.75 R, 252/406, 260/45.7 S, 260/45.7 R, 260/23 XA
[51] Int. Cl. ............................................. C08f 45/62
[58] Field of Search. 260/45.75 K, 45.85 R, 45.7 R, 260/45.7 S, 23 XA; 252/400, 406

[56] References Cited
UNITED STATES PATENTS

| 2,013,941 | 9/1935 | Young et al. | 260/45.7 |
| 2,648,650 | 8/1953 | Weinberg et al. | 260/45.75 |
| 3,067,151 | 12/1962 | Terry et al. | 260/45.7 |
| 3,533,975 | 10/1970 | Scullin | 260/23 |
| 3,565,930 | 2/1971 | Kauder et al. | 260/45.75 |
| 3,446,765 | 5/1969 | Pryer | 260/23 |

Primary Examiner—Donald E. Czaja
Assistant Examiner—V. P. Hoke
Attorney, Agent, or Firm—Jordan J. Driks; Albert L. Gazzola; Sidney Wallenstein

[57] ABSTRACT

A synergistic stabilizer composition which is a liquid at room temperature is provided for increasing resistance to early discoloration of polyvinyl chloride resins when heated to 400° F. and for improving their processibility comprising: (1) an organotin mercaptocarboxylic acid ester having tetravalent tin linked directly to carbon and to sulfur, (2) a nontoxic alkaline earth metal carbonate, and (3) an organic salt acting as a liquifier for the alkaline earth metal carbonate.

30 Claims, No Drawings

NEW SYNERGISTIC ORGANOTIN MERCAPTOCARBOXYLIC ACID ESTER STABILIZERS

The ability to tolerate higher temperatures in compounding and processing PVC is most desirable. This in turn is directly related to the ability to prevent or at least minimize the thermal degradation that sets an upper limit to applicable processing temperatures. Here, stabilizers play a two-fold role. They exert a chemical effect, still insufficiently understood, that results in a much reduced degradation of the resin. In addition, stabilizers can profoundly affect the manner in which the resin composition fuses and flows in response to applied heat and pressure. Some stabilizers accelerate fusion while others delay fusion under comparable conditions. This rheological influence of stabilizers is quite unpredictable and is responsible for the differences sometimes seen between "static" oven heat stability tests and tests carried out under "dynamic" conditions, that is tests on a moving two roll mill, mixing machine, or extruder. The search for improved stabilizers, therefore, is a quest for materials that exhibit desirable characteristics in both static an dynamic tests.

This invention relates to stabilizer compositions for polyvinyl chloride (PVC) resins which stabilizer compositions are homogeneous at ambient temperatures and comprise an organotin mercapto-carboxylic acid ester, a homogeneous nontoxic alkaline earth metal carbonate with an organic salt acting as a liquifier for the carbonate. The stabilizer compositions are characterized by visual homogeneity and the PVC resin compositions containing these compounds have as a result of the synergistic action of the components, an improved resistance to development of discoloration during heating and particularly to early discoloration when heated to 400° F., as well as improved handling characteristics during processing. These desirable properties are afforded to a much higher degree when using such combinations of compounds than when using the compounds singularly, and are of particular value for PVC compositions intended to be processed at very high temperature, such as to 400° F. These very high temperatures are becoming increasingly prevalent in processing rigid PVC by multiple screw extrusion and injection molding and also in processing plastisols.

Among the organotin stabilizers, organotin mercaptocarboxylic acid esters are now recognized as being among the most effective stabilizers for inhibiting the degradation of polyvinyl chloride resins at the high temperatures, e.g., 350° F. or 375° F. to which they are subjected during working. Although these compounds have been successful in providing good stability for 1 hour or more at 350° to 375° F., many of these compounds impart or do not entirely prevent an early yellow discoloration to the resin, which is manifested before severe heat deterioration really sets in. This early discoloration has not been considered disadvantageous for many uses where color is not an important factor, and the efforts of most workers in this field have been directed towards minimizing the onset of the more serious heat deterioration which sets in during long periods of heating normally encountered in milling of polyvinyl chloride resins. When color of the PVC resin is an important factor, because of discoloration and the accompanying haziness or cloudiness that may also appear during processing at high temperatures, it has not been possible in all cases to obtain a substantially clear and colorless PVC resin composition.

A recent improvement to the stabilizing effectiveness of the organotin mercapto-carboxylic acid esters, according to U.S. Pat. No. 3,565,930, are PVC resin stabilizer compositions having a relatively high concentration of tin, within the range of from about 18 percent to about 35 percent Sn, and a relatively high concentration of sulfur, within the range of from about 10 percent to about 25 percent S, and comprising an organotin $\alpha$- or $\beta$-mercapto-carboxylic acid ester sulfide. This composition increases the resistance to early yellow discoloration of the resin, when heated to a high temperature, to a larger extent than the prior art organotin mercapto-carboxylic acid esters discussed earlier.

Although the organotin compounds are the most effective stabilizers for PVC, they are also among the most expensive. The inherent high cost of the tin metal is very much magnified by the complexity of the multi-step synthetic process by which the tin is converted to the desired thioorganotin stabilizer.

Only the aforementioned stabilizing effectiveness of the organotin compounds warrants the high cost of these compounds.

A very large number of stabilizers other than the organotin compounds are known. Many of them are cheaper than the organotins, but they are less effective. Stabilizers in commercial use are comprehensively listed for instance by H.A. Sarvetnick, "Polyvinyl Chloride" (Van Nostrand Reinhold Company, New York, 1969) p. 98–104, who cites advantages and disadvantages of each class.

Combinations of various types of additives with organotin compounds have been proposed to improve their heat stabilizing effectiveness, and to impart special effects. For example, combinations of organotin thioglycolates with metallic and non-metallic stabilizers (U.S. Pat. No. 2,914,506); combinations of organotin half ester maleates with other organotin compounds, salts of fatty acids, phosphites and epoxy compounds (U.S. Pat. No. 2,938,013); combinations of zinc or tin salts of organic acids and thioglycolic acid esters (U.S. Pat. No. 3,067,166); and stabilizer compositions composed of organotin acid salts and thioglycolic acid ester. None of these combinations is effective in minimizing early discoloration.

U.S. Pat. No. 2,789,963 issued Apr. 23, 1957 to A.C. Hecker, describes the combination of an organotin mercapto acid ester with the salt of a multivalent metal with a weak monocarboxylic acid, e.g., calcium 2-ethylhexoate. However, the function of the salt is to prevent crystallization of the mercapto acid ester before being compounded into PVC, i.e., it acts as a preservative and has no effect on early color and/or long term stability of the resins.

Calcium carbonate in the form of finely ground natural limestone, whiting, and chalk or synthetically precipitated $CaCO_3$ has long been used as a filler in PVC resin compositions. There has been no suggestion to prepare stabilizer compositions by combining solid calcium carbonate with an organotin mercapto-carboxylic acid ester, because any combinations of solid calcium carbonate with a liquid organotin mercapto-carboxylic acid ester is nonhomogeneous and provides no advantage over the separate additions of the liquid organotin mercapto-carboxylic acid ester and the solid calcium carbonate.

It has now been found that combinations of organotin mercapto-carboxylic acid esters having tetravalent tin linked directly to carbon and to sulfur, and non-toxic alkaline earth metal carbonates, and organic salts liquifying the carbonates have the unusual property of increasing the resistance to discoloration of the polyvinyl chloride resins, particularly during the first 10 minutes of heating at 400° F., to a much larger extent than afforded by the components of the combinations when used singularly. The compositions are homogeneous liquids at ambient temperatures and can be readily measured and mixed into the resin, and are thus easy to formulate, market and use. To obtain the beneficial effects of the invention it is essential that the carbonate be in the liquid state.

In accordance with this invention there are provided stabilizer compositions for polyvinyl chloride resins comprising (a) at least one organotin mercaptocarboxylic acid ester having tetravalent tin linked to sulfur and through carbon to one or two hydrocarbon groups; (b) at least one non-toxic earth alkaline metal carbonate and (c) at least one organic salt acting as liquifier for the carbonate.

There are also provided stabilized polyvinyl chloride resin compositions comprising PVC and a stabilizer composition comprising (a) at least one organotin mercaptocarboxylic acid ester having tetravalent tin linked to sulfur and through carbon to one or two hydrocarbon groups; (b) at least one non-toxic earth alkaline metal carbonate, and (c) at least one organic salt acting as liquifier for the carbonate.

The organotin mercaptocarboxylic acid esters of the stabilizer composition of this invention may be defined by the formula:

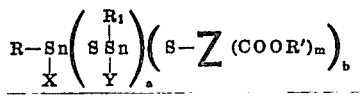

wherein
*a* is an integer of from zero to five
*b* is an integer of from one to two.
*m* is an integer of from one to two.
R and $R_1$ are hydrocarbon radicals having from one to about 18 carbon atoms and preferably from one to eight carbon atoms.
X is selected from sulfide sulfur, R, and S $Z$ $(COOR')_m$ and Y is selected from R, $R_1$, and S $Z(COOR')_m$.

R' is an organic group derived from a monohydric or polyhydric alcohol of the formula $R'(OH)_n$, wherein *n* is an integer of from one to about four, but is preferably one or two.

$Z$ is a bivalent alkylene radical carrying the S group in a position alpha or beta to a COOR' group, and can contain additional free carboxylic acid, carboxylic ester, or carboxylic acid salt groups, and mercapto groups. The radical has from one to about five carbon atoms. $Z$ accordingly includes methylene, ethylene, propylene, 1,3-butylene, 1,4-butylene, and 2,2-dimethylpropylene.

The R and $R_1$ hydrocarbon groups can be selected from among alkyl, cycloalkyl, and alkyl cycloalkyl, groups having from one to 18 carbon atoms, and can be the same or different.

The R and $R_1$ groups may, for example, be methyl, ethyl, propyl, isopropyl, n-butyl, isobutyl, tert-butyl, sec-butyl, amyl, hexyl, n-octyl, 2-ethylhexyl, isooctyl, dodecyl, palmityl, myristyl, stearyl, cyclohexyl, cyclooctyl, cycloheptyl, cyclopentyl, 1-methyl cyclopentyl and cyclopentane methyl and the like.

R' may be alkyl, alkylene, alkenyl, mixed aryl-alkyl, cycloaliphatic and heterocyclic, and may contain from about one to about 30 carbon atoms, and may also contain ester groups, alkoxy groups, hydroxyl groups, halogen atoms and other substituents. Preferably, R' is derived from a monohydric alcohol containing from one to about 15 carbon atoms, such as methyl, ethyl, propyl, n-butyl s-butyl, isobutyl, octyl, isooctyl, 2-ethylhexyl, 2-octyl, and, lauryl alcohol and the like; cyclic monohydric alcohols, such as cyclopentanol, cyclohexanol, 4-methylcyclohexanol, 2-phenylcyclohexanol, 3,3,5-trimethyl cyclohexanol, and cyclooctanol, cyclododecanol and the like; or from a dihydric alcohol such as glycols containing from two to about 15 carbon atoms, including ethylene glycol, propylene glycol, diethylene glycol, dipropylene glycol, tetramethylene glycol, neopentyl glycol and 2,2,4-trimethyl pentanediol, 2,2,4,4-tetramethyl cyclobutane-diol, cyclohexane-1,4-dimethanol, and polyols such as glycerine, sorbitol, pentaerythritol, dipentaerythritol, and trimethylol propane and the like.

The alcohol R' $(OH)_n$ need not be a single compound. Many of the commercially available and inexpensive alcohol mixtures are suitable and advantageous. The branched-chain primary alcohols made by the "oxo" process and known as isooctyl, isodecyl and isotridecyl alcohols are mixtures of isomers, but can be used as if they were single compounds. Other alcohol mixtures that may be used include homologous mixtures of reaction products of ethylene oxide with alcohols, phenols, or carboxylic acids of the proper carbon content.

The S-$Z$-$(COOR_1)_m$ groups are derived from mono or poly$\alpha$- and $\beta$-mercapto-carboxylic acid esters by removal of the hydrogen atom of the mercapto group. These include the esters of aliphatic acids which contain at least one mercapto group, such as, for example, esters of mercapto-acetic acid, $\alpha$- and $\beta$-mercapto-propionic acid, $\alpha$- and $\beta$-mercapto-butyric acid and $\alpha$- and $\beta$- mercapto-valeric acid, $\alpha$- and $\beta$-mercapto-hexanoic acid, thiomalic-acid, $\alpha$- and $\beta$-mercapto-adipic acid and $\alpha$- and $\beta$-mercapto-pimelic acid.

Organotin mercapto-carboxylic acid esters containing only sulfur linked to tin and carbon are defined by the above formula where X is either a R hydrocarbon radical or an S $Z$ $(COOR')_m$ group, and *a* is zero.

These mercapto acid esters may be readily prepared by reaction of the mercaptocarboxylic acid esters with the corresponding organotin oxide or chloride or hydrocarbon stannonic acid. For a more complete explanation of the process for making, and for additional examples of these diorganotin mercapto ester compounds, see U.S. Pat. Nos. 2,648,650 and 2,832,750 to Weinberg et al., U.S. Pat. Nos. 2,641,596 and 2,752,325 to Leistner, and U.S. Pat. No. 3,115,509 to Mack, and Canadian Pat. No. 649,989 to Mack.

The organotin mercapto-carboxylic acid esters containing different mercapto acid ester groups can be prepared by reacting the desired organotin oxide or chloride with a mixture of the mercapto acid esters, or by heating the different organotin esters together.

The following organotin mercapto acid esters are exemplary of those which are useful according to this invention: methyltin tris(n-octylthioglycolate); dimethyltin bis(2-ethylhexylthioglycolate); n-butyltin tris(isooctylthioglycolate); n-butyltin tris(3,4,5-trimethylhexyl thiomalate); di-n-dodecyltin bis(isoamyl thiolactate); di-isobutyltin bis(isodecyl 3-mercaptopropionate); di-n-hexyltin bis(isobutyl thioglycolate); n-octyltin tris(cyclohexyl 3-mercaptopropionate); dicyclopentyltin bis(methyl 3-mercaptobutyrate); ethyltin tris (ethyl 2-mercaptomyristate); isopropyltin tris(methoxyethyl 3-mercaptopropionate); di-t-butyltin bis((2-butoxyethoxy)ethyl thioglycolate); di-n-butyltin bis((2-hydroxyethoxy)ethyl 3-mercaptopropionate); dinonyltin bis(glyceryl monothioglycolate); n-propyltin tris(methyl 2-mercaptobenzoate); t-butyltin bis($C_{12}$-$C_{15}$-alkyl mercaptopropionate)octadecyl thioglycolate); di-n-butyltin isooctyl thioglycolate-isopropyl 2-mercaptostearate; dimethyltin bis(10 mole ethoxylated nonylphenol thioglycolate); isoamyltin tris(tetrahydrofurfuryl 3-mercaptopropionate); and the like as well as mixtures of these with one another.

The above formula of the organotin mercaptocarboxylic acid ester also defines organotin mercaptocarboxylic ester sulfides which are preferred components of the stabilizer composition of this invention. For example, the organotin mercaptocarboxylic acid ester sulfides of the invention can fall into one of the following general categories where $a$, $b$, X and Y of the general formula are as shown.

A. 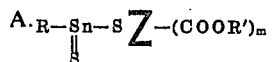

$a = 0$, $b = 1$, X is sulfide sulfur

B. 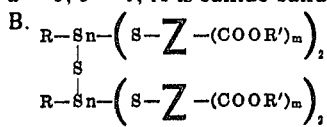

$a = 1$, $b = 2$, X and Y are S $Z$(COOR')$_m$

C. 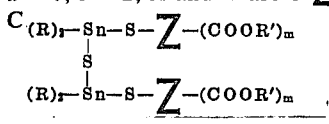

$a = 1$, $b = 2$, X and Y are R.

D. 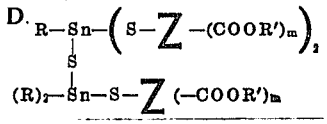

$a = 1$, $b = 2$, X is R and Y is S $Z$(COOR')$_m$

The organotin mercapto acid ester sulfides of the invention may be prepared by reacting diorganotin halides, monoorganotin halides or mixtures thereof, with less than stoichiometric amounts of mercaptocarboxylic acid ester, and the resulting organotin mercapto acid ester halide intermediate may be further reacted with alkali or alkaline earth metal sulfides. For a more complete description of the process for making these organotin mercapto ester sulfides see U.S. Pat. No. 3,565,930 to Kauder et al col. 4, line 75 – col. 6, line 14.

Organotin mercaptocarboxylic acid ester sulfides which may be used according to this invention include: mono-n-butyltin monoisooctyl thioglycolate sulfide, bis-(di-n-butyltin monoisooctyl thioglycolate)sulfide, mono-n-octyltin monocyclohexyl thioglycolate sulfide, bis-(di-n-octyltin monocyclohexyl thioglycolate) sulfide, bis-(n-butyltin di-n-butyl thiomalate) sulfide, bis-(di-n-butyltin mono(isooctyl thioglycolate) sulfide, bis-(n-octyltin di-2-ethylhexyl beta mercaptopropionate) sulfide, bis-(di-n-octyltin monoisooctyl thioglycolate) sulfide, bis-(n-octyltin diisooctyl thioglycolate) sulfide, as well as the organotin mercaptocarboxylic acid ester sulfides whose preparation is shown in Examples A to M from U.S. Pat. No. 3,565,930 and the organotin mercaptocarboxylic acid ester sulfides shown by structural formula in col. 6 and 7 of the same patent and include mixtures of these with one another.

The second component of the stabilizer compositions of this invention is the carbonate of calcium and magnesium or a combination thereof and the third component is at least one calcium or magnesium organic salt usually in a low volatile organic liquid acting as a liquifying agent, for the carbonate by itself or with volatile or non-volatile polar components.

The organic liquid can be a hydrocarbon oil, a plasticizer, an epoxy ester, etc. or a combination thereof.

The presence of the organic salt component of the stabilizer is essential to the homogeneous liquid state of the complete stabilizer.

From this it follows that the carbonate is characterized by the presence of an organic salt the third component of the stabilizer composition which disperses the carbonate during or after its formation in an organic solvent.

The proportions of carbonate to organic salt in the carbonate-organic salt combination is defined by the metal ratio which is a number great than two, i.e., the number of metal equivalents is greater than the number of equivalents of the organic acid residue of the organic salt. The metal ratio can be as high as 60 or even higher, limited only by the viscosity of the metal carbonate-organic salt combinations.

The acid residue of the organic salt is aromatic, contains sulfur, and has at least 20 carbon atoms. There is no upper limit for the carbon content except that set by the availability of materials. Organic salts with as many as 150 carbon atoms in the acid residue give excellent results.

Preferred organic salts are salts from the class of calcium and magnesium sulfonates and calcium and magnesium sulfurized phenates having at least 20 carbon atoms.

Typical sulfonic acids that can be used in form of their calcium and magnesium salts are the oil-soluble-petroleum sulfonic acids, commonly referred to as "mahogany acids," of about 350 to about 750 molecular weight, aryl sulfonic acids, and alkaryl sulfonic acids. Illustrative of such sulfonic acids are dilauryl benzene sulfonic acid, lauryl cetyl benzene sulfonic acid, paraffin-substituted benzene sulfonic acids, polyolefin alkylated benzene sulfonic acids, such as polybutylene alkylated benzene sulfonic acids in which the polybutylene substituents have molecular weights of at least about 200, and preferably within the range of from about 300 to about 2500, and polypropylene alkylated benzene sulfonic acids in which the polypropylene substituents have a molecular weight of at least about 250, and preferably within the range of from about 290 to about 1,500.

Examples of other suitable sulfonic acids are monoparaffin wax-substituted naphthalene sulfonic acids, diparaffin wax-substituted phenol sulfonic acids, petroleum naphthalene sulfonic acids, naphthalene disulfide sulfonic acids, naphthalene disulfide disulfonic acids, cetyl chlorobenzene sulfonic acids, cetyl-phenol disulfide sulfonic acids, cetylphenol monosulfide sulfonic acids, dilauryl betanaphthol sulfonic acids. Other usable oil-soluble sulfonic acids are well described in the art, for example, see U.S. Pat. No. 2,616,905.

Typical sulfurized phenols that can be used in the form of their calcium or magnesium salts may be derived from substituted phenols wherein the substituent on the aromatic nucleus is a hydrocarbon radical which may be cyclic or acyclic, saturated or unsaturated, having from four to 30 carbon atoms, there being from one to five substituents. The term "phenols" is meant to include phenols, naphthols and other hydroxy aromatic compounds, phenol being preferred. Substituents on the aromatic nucleus can include alkyl radicals such as butyl, hexyl, octyl, decyl, dodecyl, hexadecyl; petroleum-based radicals such as white oil or wax; polyolefinic radicals such as polypropylene; and aryl radicals such as phenyl, phenyldecyl, amylphenyl. The sulfurized alkyl phenols, also termed alkylphenol sulfides, preferably have a single ring substitution of from eight to 16 carbon atoms. The percent of sulfur present in the sulfurized phenol is at least about 5 percent and may range to over 15 percent, and there are usually one to two S atoms in the molecule. Sulfurized phenols that may be used in the form of their calcium and magnesium salts include also alkylthiobisphenols and alkylpolythiobisphenols such as t-amylphenol sulfide, s-amylphenol disulfide, 2,2'-thiobis-4-octylphenol, 2,2'-thiobis-p-dodecylphenol, nonylphenol disulfide, dodecylthiobisphenol, 4,4'-thiobis(3-methyl-6-t-butylphenol), and bis(3-t-butyl-4-hydroxy-5-methylbenzyl)sulfide.

The organic salts may be accompanied by the organic acid from which the salt is generated by reaction with the metal base used in its preparation.

Many liquid calcium and magnesium carbonate-organic salt combinations are known in the art. Unfortunately, the terminology employed is not uniform and such combinations are sometimes referred to as solutions of oil-soluble metal carbonates and sometimes as dispersions of oil insoluble metal carbonates. The compositions are often called "overbased" to indicate that the ratio of total metal contained therein to the organic moiety is greater than the stoichiometric ratio of the neutral organic salt, i.e., the number of metal equivalents is greater than the number of equivalents of the acid residue. Analytical techniques are available for determining the metal ratio and to characterize the liquid combinations of calcium or magnesium carbonate with organic salts. The total metal content can be determined by standard methods such as atomic absorption, or extraction into aqueous hydrochloric acid and complexometric titration of the metal in the extract. When the organic salt is a sulfonate, titration of a sample with perchloric acid according to ASTM method D-28-96-70T measures only that part of the total metal content which is present as carbonate, while the part of the metal that is linked to the sulfonic acid is not titrated in this determination. For the bivalent metals, calcium and magnesium, the metal ratio is then given by the expression:

$$2 \times \frac{\text{total equivalents of metal per g. of sample}}{\text{total equivalents of metal per g. of sample-equivalents metal per g. of sample by ASTM D-2896-70T titration}}$$

Alternatively, the metal present as carbonate is measured in terms of the combined carbon dioxide content and the metal ratio is given by the expression:

$$2 \times \frac{\text{total equivalents of metal/g. of sample}}{\text{total equivalents of metal/g. of sample-equivalents } CO_2/g.}$$

This method is applicable to both sulfurized phenates and sulfonates as the organic salt component of the stabilizers of this invention.

The liquid combinations of calcium and magnesium carbonate with organic salts can be readily prepared by suspending a calcium or magnesium alkaline metal base, in a polar organic medium, carbonating the metal compound at elevated temperatures and transferring the carbonated product to a low volatile organic liquid containing an organic salt with or without subsequent hydrolysis and removal of volatiles before final filtration of the resulting liquid. The sequence of operations is not critical; the organic salts, for example, can be already present during the carbonation.

The polar organic medium used for the reaction can contain volatile and non-volatile polar compounds. The volatile polar compounds are usually removed during the process and are not present in the finished product. These volatile and non-volatile compounds are called in the literature promoters. A comprehensive overview of the liquid combinations of organic salts with calcium and magnesium carbonates, their ingredients and their methods of manufacture can be obtained from patents R. Hurd U.S. Pat. No. 3,350,310, M. Hunt U.S. Pat. No. 3,150,088, R. Schlicht U.S. Pat. No. 3,057,896, and others. A number of liquid combinations of organic salts with calcium and magnesium carbonate are commercially available and suitable for use in preparing the stabilizer compositions of this invention. The following represents a non-limiting selection.

| Material | Supplier | Typical Properties |
|---|---|---|
| Calcium carbonate-calcium petroleum sulfonate (Grade 300) | Sonneborn Div. Witco Chem. Corp. New York, N.Y. | Total Base No. 300 11.8% Ca, metal ratio 21.4 |
| Calcium carbonate-calcium petroleum sulfonate (Grade 25C) | Sonneborn Div. Witco Chem. Corp. New York, N.Y. | Total Base No. 25, 3.0% Ca, metal ratio 2.9 |
| Magnesium carbonate-magnesium petroleum sulfonate | Conoco Chemicals Continent. Oil Corp. Saddle Brook, N.J. | Two Grades, Total Base No. 300 and 400 |

| Material | Supplier | Typical Properties |
|---|---|---|
| Calcium carbonate-calcium polydodecyl benzene-sulfonate | Continent. Oil Corp. | Two Grades, Total Base No. 300 and 400 |
| Calcium carbonate-calcium dodecyl thiobisphenate | Lubrizol Corp. Wickcliff, Ohio | Total Base No. 260, 9.3% Ca, 2.1% S, metal ratio 7.2 |

PREPARATION OF STABILIZER COMPOSITIONS 1-29

The stabilizer compositions are prepared by mixing together the organotin mercapto-carboxylic acid ester component and the liquid carbonate organic salt combination with heating where necessary until a stable homogeneous liquid is obtained. The proportions of organotin component to carbonate organic salt combination range from about 1:1 to 25:1 by weight.

Heating of the mixture is often necessary in order to secure a storage stable homogeneous liquid stabilizer composition. Apparently some reaction occurs between the organotin and the carbonate and organic salt components stabilizing the complete stabilizer composition. The reaction temperature required ranges from ambient to about 300° F. depending upon the components used.

The examples 1-29 contained in Table I represent preferred embodiments of the preparation of the stabilizer compositions in accordance with the invention.

All parts are by weight. Metal ratio (M.R.) refers to carbonate-organic salt combination, from which the carbonate-organic salt weight proportions can be calculated.

| Example No. | Components | Metal Ratio (M.R.) | Parts | Mixing Time (Hrs.) | Temp°F. |
|---|---|---|---|---|---|
| 1 | Mono-n-butyltin tris(isooctyl thioglycolate) | | 135 | | |
| | Calcium carbonate-calcium dodecyl thiobisphenate | 7.2 | 45 | 2 | 230 |
| 2 | Mono-n-butyltin tris(isooctyl thioglycolate) | | 135 | | |
| | Calcium carbonate-calcium petroleum sulfonate | 21.6 | 45 | 1 | 140 |
| 3 | Di-n-butyltin di(isooctyl thioglycolate) | | 135 | | |
| | Calcium carbonate-calcium dodecyl thiobisphenate | 7.2 | 45 | 1 | 230 |
| 4 | Mono-n-butyltin tris(isooctyl thioglycolate) | | 90 | | |
| | Calcium carbonate-calcium dodecyl thiobisphenate | 7.2 | 90 | 2 | ambient to 300 |
| 5 | Mono-n-butyltin tris(isooctyl thioglycolate) | | 135 | | |
| | Magnesium carbonate-magnesium petroleum sulfonate | 3.0 | 45 | 2 | 230 |
| 6 | Mono-n-butyltin tris(isooctyl thioglycolate | | 135 | | |
| | Magnesium carbonate-magnesium petroleum sulfonate | 3.0 | 35 | 2 | 230 |
| | 2,6-Di-t-.butyl p.-cresol | | 10 | | |
| 7 | Mono-n-butyltin tris(isooctyl thioglycolate) | | 135 | | |
| | Calcium carbonate-calcium petroleum sulfonate | 2.9 | 35 | 2 | 170 |
| | 2,6-Di-t-.butyl p.-cresol | | 10 | | |

| Example No. | Components | Metal Ratio (M.R.) | Parts | Mixing Time (Hrs.) | Temp°F. |
|---|---|---|---|---|---|
| 8 | *Di-n-butyltin di(isooctyl thioglycolate) | | 130 | | |
| | | | | 2 | 195 |
| | Calcium carbonate-calcium dodecyl thiobisphenate | 7.2 | 20 | | |
| 9 | Di-n-butyltin di(isooctyl thioglycolate) | | 150 | | |
| | | | | 2 | 230 |
| | Calcium carbonate-calcium dodecyl thiobisphenate | 7.2 | 50 | | |
| 10 | Di-n-butyltin di(isooctyl thioglycolate) | | 125 | | |
| | | | | 2 | 195 |
| | Calcium carbonate-calcium dodecyl thiobisphenate | 7.2 | 25 | | |
| 11 | Di-n-octyltin di(isooctyl thioglycolate) | | 125 | | |
| | | | | 1 | ambient |
| | Calcium carbonate-calcium dodecyl thiobisphenate | 7.2 | 25 | | |
| 12 | *Di-n-butyltin di(isooctyl thioglycolate) | | 140 | | |
| | | | | 1 | ambient |
| | Calcium carbonate-calcium petroleum sulfonate | 21.4 | 10 | | |
| 13 | *Di-n-butyltin di(isooctyl thioglycolate) | | 130 | | |
| | | | | 1 | ambient |
| | Calcium carbonate-calcium petroleum sulfonate | 21.4 | 20 | | |
| 14 | *Di-n-butyltin di(isooctyl thioglycolate) | | 128 | | |
| | | | | 1 | ambient |
| | Calcium carbonate-calcium petroleum sulfonate | 21.4 | 20 | | |
| | Stannous 2-ethylhexoate | | 2 | | |
| 15 | Di-n-butyltin di(isooctyl 3-mercaptopropionate) | | 125 | | |
| | | | | 2 | 140 |
| | Calcium carbonate-calcium dodecyl thiobisphenate | 7.2 | 25 | | |
| 16 | Dimethyltin di(isooctyl thioglycolate) | | 125 | | |
| | | | | 2 | 230 |
| | Calcium carbonate-calcium dodecyl thiobisphenate | 7.2 | 25 | | |
| 17 | Mono-di-n-butyltin isooctyl thioglycolate-sulfide | | 125 | | |
| | | | | 2 | 230 |
| | Calcium carbonate-calcium dodecyl thiobisphenate | 7.2 | 25 | | |
| 18 | Mono-n-butyltin tris(isooctyl thioglycolate) | | 50 | | |
| | | | | 3 | 212 |
| | Di-n-butyltin di(isooctyl thioglycolate | | 20 | | |
| | Calcium carbonate-calcium dodecyl thiobisphenate | 7.2 | 30 | | |

| Example No. | Components | Metal Ratio (M.R.) | Parts | Mixing Time (Hrs.) | Temp°F. |
|---|---|---|---|---|---|
| 19 | Di-n-butyltin di(isooctyl thioglycolate) | | 99 | | |
| | | | | 2 | 140 |
| | Zinc 2-ethyl-hexoate | | 1 | | |
| | Calcium carbonate-calcium dodecyl thiobisphenate | 7.2 | 20 | | |
| 20 | Di-n-butyltin di(isooctyl thioglycolate) | | 90 | | |
| | | | | 2 | 140 |
| | Di-n-butyltin oxide-dioctyl-phthalate-complex | | 10 | | |
| | Calcium carbonate-calcium dodecyl thiobisphenate | 7.2 | 20 | | |
| 21 | Di-n-butyltin di(isooctyl thioglycolate) | | 125 | | |
| | | | | 1 | 140 |
| | Calcium carbonate-calcium petroleum sulfonate | 21.4 | 72 | | |
| | Stannous 2-ethyl-hexoate | | 3 | | |
| 22 | Di-n-butyltin di(isooctyl thioglycolate) | | 50 | | |
| | | | | 1 | 140 |
| | Calcium carbonate-calcium petroleum sulfonate | 2.9 | 48 | | |
| | Stannous 2-ethyl-hexoate | | 2 | | |
| | Diphenyl isooctyl phosphite | | 100 | | |
| 23 | n-Octyltin tris (isooctyl thioglycolate) | | 45 | | |
| | | | | 2 | 165 |
| | Di-n-butyltin sulfide | | 35 | | |
| | Magnesium carbonate-magnesium petroleum sulfonate (Base No. 300) | | 20 | | |
| 24 | Di-n-octyltin bis (n-propyl 3-mercaptopropionate) | | 75 | | |
| | | | | 3 | 230 |
| | Magnesium carbonate-calcium dodecylthiobisphenate | 6.1 | 25 | | |
| 25 | n-Octyltin tris (2-ethoxyethyl thioglycolate) | | 20 | | |
| | | | | 4 | 225 |
| | Di-n-octyltin bis(2-ethoxyethyl thioglycolate) | | 80 | | |
| | Calcium carbonate-calcium dodecyl benzenesulfonate | 25.6 | 30 | | |
| | n-Octadecyl 3,5-di-t-butyl-4-hydroxyphenyl-propionate | | 3 | | |
| 26 | Methyltin tris (n-hexyl thioglycolate) | | 42 | | |
| | | | | 1 | 140 |
| | Di-cyclohexyltin bis(n-hexyl 3-mercapto propionate) | | 52 | | |
| | Calcium carbonate-calcium nonylthiobisphenate | 7.2 | 6 | | |
| 27 | n-Tetradecyl-tin tris(2-ethylbutyl thioglycolate | | 65 | | |
| | | | | 2 | 220 |

| Example No. | Components | Metal Ratio (M.R.) | Parts | Mixing Time (Hrs.) | Temp°F. |
|---|---|---|---|---|---|
| 28 | Calcium carbonate-calcium petroleum sulfonate | 21.4 | 32 | | |
| | Bis(3,5-di-t-butyl-4-hydroxy benzyl)sulfide | | 3 | | |
| | Dimethyltin bis (dibutyl thiomalate) | | 40 | | |
| | | | | 2 | 220 |
| | Cyclopentyltin tris(ethyl 2-mercaptomyristate) | | 45 | | |
| 29 | Magnesium carbonate-magnesium petroleum sulfonate | 3.0 | 15 | | |
| | n-Butyltin tris (isooctyl thioglycolate) | | 60 | | |
| | | | | 2 | 140 |
| | Dimethyltin sulfide | | 15 | | |
| | Calcium carbonate-calcium polydodecylbenzenesulfonate | 25.6 | 10 | | |
| | Tris(nonyl phenyl) phosphite | | 10 | | |

* Modified with 1.5% 3-mercaptopropionic acid, see U.S. 3,507,827.

The stabilizer compositions of the invention can be employed with other conventional polyvinyl chloride resin heat stabilizers.

Metal-containing heat stabilizers that can be used include organotin compounds such as dimethyltin sulfide, dibutyltin sulfide, and monobutyltin sulfide, dibutyltin dilaurate, dibutyltin maleate and other organotin carboxylates; complexes of dibutyltin oxide with organic esters such diisooctylphthalate, propylene dioleate and dodecyl adipate; zinc and stannous tin salts of medium or high molecular weight fatty acids, for example, zinc 2-ethylhexoate, zinc stearate, stannous benzoate, stannous neodecanoate, and stannous oleate.

Non-metallic heat stabilizers include phenols, organic phosphites, thiodipropionic acids or esters and epoxy compounds. A comprehensive disclosure of representatives of each of these classes of compounds is found in U.S. Pat. No. 3,398,114 issued Aug. 20, 1968, and is incorporated here by reference. A particularly preferred class of auxiliary stabilizers are the hindered phenols, representative of which are described in A. Hecker U.S. Pat. No. 3,479,309 col. 8, line 13 through col. 9, line 37 which is incorporated here by reference.

A total of from 0.1 to 5 parts preferably 0.25 to 2.5 parts by weight of the entire stabilizer composition may be used for each 100 parts by weight of the resin. More stabilizer compositions than indicated above may be used, but there is no particular advantage in using such increased amounts.

The invention is applicable to any vinyl chloride polymers. The term PVC, as used herein, includes not only vinyl chloride homopolymers but also after-chlorinated polyvinyl chlorides as a class, for example, those disclosed in British Pat. No. 893,288, and also copolymers of vinyl chloride in a major proportion and other copolymerizable monomers in a minor proportion, such as copolymers of vinyl chloride and vinyl acetate, copolymers of vinyl chloride maleic or fumaric acid or esters, and copolymers of vinyl chloride with styrene. This invention is also applicable to mixtures of polyvinyl chloride in a major proportion with a minor proportion of other synthetic resins such as chlorinated polyethylene or a copolymer of acrylonitrile, butadiene and styrene.

As will be seen from subsequent examples, the stabilizer compositions of this invention provide unexpected favorable flow properties along with their heat stabilizing effectiveness.

The invention is applicable to rigid, semi-rigid and plasticized formulations. Rigid resins contain less than 10 percent plasticizer, semi-rigids from about 10 percent to about 15 percent plasticizer, and plasticized resins from 15 percent to 50 percent or more of plasticizer.

For semi-rigid and plasticized formulations, there may be incorporated plasticizers such as phthalate, sebecate, adipate, phosphate, and fatty acid esters having from 16 to 150 carbon atoms. For a thorough discussion of plasticizers, see Sarvetnick op. cit. p. 67–87.

A small amount, usually not more than 1.5 percent of a parting agent or lubricant, also can be included. Typical parting agents are the higher aliphatic acids, and salts having 12 to 24 carbon atoms, such as stearic acid, lauric acid, palmitic acid and myristic acid, lithium stearate and calcium palmitate, mineral lubricating oils, petrolatum, polyethylene, paraffin wax, and ester waxes such as stearyl stearate, cetyl palmitate and glycol esters of oxidized Montan wax esters of which the 1,4-butanediol ester is typical.

Polymeric modifiers, for improving the toughness or impact-resistance of unplasticized resins, can also be added to the resin compositions stabilized by the present invention in minor amounts of usually not more than 10 percent. Examples of such polymeric modifiers include chlorinated polyethylene, ABS polymers, polyacrylate-butadiene graft copolymers, and methyl methacrylate-ethyl acrylate copolymers.

For some applications it may be desirable to include a filler in the PVC resin, i.e., to act as an extender, increase hardness, and hot deformation resistance, or to achieve some degree of reinforcing, etc. Among the fillers calcined clays and calcium carbonate are widely used; they are inert and have no effect on the heat stability of PVC; they do not function like the liquid carbonates of this invention.

If color has to be imparted to the resin, pigments may be added without affecting the stabilizer's effectiveness when selected judiciously.

The preparation of the polyvinyl chloride resin composition is easily accomplished by conventional procedures. The selected stabilizer combination is formed as described above, and then is blended with the polyvinyl chloride resin, or alternatively, the components are blended individually in the resins using, for instance, a two or three roll mill, at a temperature at which the mix is fluid and thorough blending facilitated, milling the resin composition including any plasticizer at from 250° to 375° F. for a time sufficient to form a homogeneous mass, 5 minutes, usually. After the mass is uniform, it is sheeted off in the usual way.

For the commercial processing of rigid polyvinyl chloride, the stabilizer is conveniently mixed with all or a portion of the polymer to be stabilized with vigorous agitation under such conditions of time and temperature that the stabilizer is sufficiently imbibed by the polymer to produce a dry, free-flowing powder. The well-known Henschel mixer is well suited to this procedure.

As shown below the heat stability of these resin compositions is determined at an oven temperature of 400° F. This procedure appears to be unique, as the prior art evaluates heat stabilizers at temperatures below 400° F. The high test temperature is in line with the increasingly high temperatures used in industrial processing to speed up extrusion and molding operations.

The following examples 30–50 represent embodiments of polyvinyl chloride resin compositions incorporating the organotin mercaptocarboxylic acid ester and the carbonate and organic salt components of the stabilizer in accordance with the invention.

EXAMPLES 30-31

A series of rigid or nonplasticized formulations is prepared following the above general procedure.

The selected stabilizer composition is mixed into the resin on a two roll mill to form a homogeneous sheet. Strips are cut off from the sheet and heated in an oven at 400° F. for 40 minutes to determine heat stability. Pieces of each strip are removed at 5 minute intervals and affixed to cards to show the progressive heat deterioration.

The heat degradation is evaluated by the amount of color formed, i.e., the extent of discoloration relative to the controls.

The discoloration is rated visually by color and recorded, according to the following abbreviations.

| a amber | b brown | v very |
| w white | r red | l light |
| g gray | ch chocolate | d dark |
| t tan | bl black | * with brown edges |
| pk pink | pur purple | ** with spots |
| o orange | c colorless | *** with dark spots |
| y yellow | p pale | ↑ with gas bubbles |

The composition of the samples is as follows:

| Ingredients: | | Parts By Weight |
|---|---|---|
| Polyvinyl chloride homopolymer (SM 200) | | 100 |
| Methyl methacrylate-ethyl acrylate copolymer (K-120N) | | 2 |
| Titanium dioxide (TiO$_2$) | | 2 |
| Butylene glycol ester of Montan wax acid (Wax E) | | 0.25 |
| Stabilizer composition (from Table I): | | 1.8 |
| Example 30: 1. | Monobutyltin tris(isooctyl-tin thioglycolate) | 1.35 |
| | Calcium carbonate-calcium dodecyl thiobisphenate | 0.45 |
| Example 31: 2. | Monobutyltin tris(isooctyl thioglycolate) | 1.35 |
| | Calcium carbonate-calcium petroleum sulfonate | 0.45 |

Compounds A-C representing the single components of the stabilizer composition tested in Table II are used as controls:

| | | Parts |
|---|---|---|
| A: | Monobutyltin tris(isooctyl thioglycolate) | 1.8 |
| B: | Calcium carbonate-calcium dodecyl thiobisphenate | 1.8 |
| C: | Calcium carbonate-calcium petroleum sulfonate | 1.8 |

Due to the pigment (TiO$_2$) the resin has a white initial color.

TABLE II

| Time at 400°F. (Minutes) | CONTROLS: A | B | C | Examples: Stabil. Compos. | 30 1 | 31 2 |
|---|---|---|---|---|---|---|
| 0 | w | lpk | pk | | w | w |
| 5 | vpy | b | ch | | w | vpy |
| 10 | py | b | ch | | w | py |
| 15 | py | b | ch | | w | py |
| 20 | y | b | ch | | py | y |
| 25 | g | b | ch | | y | g |
| 30 | g | b | ch | | g | g |
| 35 | g↑ | b | ch | | g | g |
| 40 | g↑ | b | ch | | g | g |

The stabilizer compositions of Examples 30 and 31 contain 75 percent respectively of the amount of tin of control A and surprisingly give better results in both the critical early heating periods representative of the heat history in production and also in avoiding the appearance of gass bubbles on more extensive degradation, thus providing an element of safety in case of an emergency.

EXAMPLES 32–34

The procedure of Examples 30 and 31 is followed in preparing and testing the resin compositions.

The appearance of the samples is given in Table III. The controls are:

| | | Parts |
|---|---|---|
| A: | Mono-n-butyltin tris(isooctyl thioglycolate) | 1.8 |
| B: | Mono-n-butyltin tris(isooctyl thioglycolate)2,6-Di-t.-butyl p.-cresol | 1.7 |
| | | 0.1 |
| C: | Magnesium carbonate-magnesium petroleum sulfonate | 1.8 |
| D: | Magnesium carbonate-magnesium petroleum sulfonate 2,6-Di-t.-butyl p.-cresol | 1.7 |
| | | 0.1 |
| E: | Calcium carbonate-calcium petroleum sulfonate | 1.8 |
| F: | Calcium carbonate-calcium petroleum sulfonate 2,6-Di-t.-butyl p.-cresol | 1.7 |
| | | 0.1 |

The stabilizer compositions are:

| | | Parts | Examples |
|---|---|---|---|
| 5. | Mono-n-butyltin tris(isooctyl thioglycolate) | 1.35 | 32 |
| | Magnesium carbonate-magnesium petroleum sulfonate | 0.45 | |
| 6. | Mono-n-butyltin tris(isooctyl thioglycolate) | 1.35 | 33 |
| | Magnesium carbonate-magnesium petroleum sulfonate | 0.35 | |
| | 2,6-Di-t.-butyl p.-cresol | 0.10 | |
| 7. | Mono-n-butyltin tris(isooctyl thioglycolate) | 1.35 | 34 |
| | Calcium carbonate-calcium petroleum sulfonate | 0.35 | |
| | 2,6-Di-t.-butyl p.-cresol | 0.10 | |

TABLE III

| Time at 400°F. (Minutes) | Controls: A | B | C | D | E | F | Examples: Stabil. Compos. | 32 5 | 33 6 | 34 7 |
|---|---|---|---|---|---|---|---|---|---|---|
| 0  | w   | w   | pk | pk | lpk | lpk | | w   | w   | w   |
| 5  | vpy | vpy | ch | ch | b   | b   | | w   | w   | w   |
| 10 | py  | py  | ch | ch | b   | b   | | vpy | w   | vpy |
| 15 | py  | g   | ch | ch | b   | b   | | vpy | vpy | vpy |
| 20 | y   | g   | ch | ch | b   | b   | | py  | py  | py  |
| 25 | g   | g   | ch | ch | b   | b   | | g   | y   | lg  |
| 30 | g   | g   | ch | ch | b   | b   | | g   | lg  | lg  |
| 35 | g↑  | g↑  | ch | ch | b   | b   | | g   | lg  | lg  |
| 40 | g↑  | g↑  | ch | ch | b   | b   | | g   | g   | g   |

The results demonstrate that the liquid organotincarbonate-organic salt stabilizer compositions of Examples 32 to 34 containing only 75 percent and 80 percent of the tin quantity in the organotin controls A and B respectively provide an improved performance in both early and later heating testing periods, both with and without an added phenolic antioxidant. The phenolic antioxidant has no stabilizing contribution alone or combined with only the organotin or only the carbonate and organic salt ingredients of the stabilizer composition.

EXAMPLES 35–40

A rigid nonplasticized formulation is prepared having the following composition:

| Ingredients | Parts By Weight |
|---|---|
| Polyvinyl chloride homopolymer K = 65 | 100 |
| Acrylonitrile-butadiene-styrene copolymer (Blendex 401) | 10 |
| Titanium dioxide | 2 |
| Calcium stearate | 1 |
| Stabilizer composition (from Table I) | 1.5 |

The same procedure as in Examples 29–34 is followed in preparing and testing the resin. The appearance of the test samples is set out in Table IV.

The controls are again the single components of the tested stabilizer compositions:

| | | Parts |
|---|---|---|
| A: | Di-n-butyltin di(isooctyl thioglycolate) | 1.5 |
| B: | Di-n-butyltin di(isooctyl thioglycolate) + 1.5% 3-mercaptopropionic acid | 1.5 |
| C: | Calcium carbonate-calcium dodecyl thiobisphenate | 1.5 |
| D: | Calcium carbonate-calcium petroleum sulfonate | 1.5 |
| E: | Stannous octoate | 1.5 |
| F: | Calcium carbonate-calcium petroleum sulfonate | 1.35 |
| | Stannous octoate | 0.15 |

The stabilizer compositions are:

| | | Parts | Examples |
|---|---|---|---|
| 8. | Di-n-butyltin di(isooctyl thioglycolate) | 1.3 | 35 |
| | Calcium carbonate-calcium dodecyl thiobisphenate | 0.20 | |
| 9. | Di-n-butyltin di(isooctyl thioglycolate) | 1.13 | 36 |
| | Calcium carbonate-calcium dodecyl thiobisphenate | 0.37 | |
| 10. | Di-n-butyltin di(isooctyl thioglycolate) | 1.25 | 37 |
| | Calcium carbonate-calcium dodecyl thiobisphenate | 0.25 | |
| 12. | *Di-n-butyltin di(isooctyl thioglycolate) | 1.4 | 38 |
| | Calcium carbonate-calcium petroleum sulfonate | 0.1 | |
| 13. | *Di-n-butyltin di(isooctyl thioglycolate) | 1.30 | 39 |
| | Calcium carbonate-calcium petroleum sulfonate | 0.20 | |
| 14. | *Di-n-butyltin di(isooctyl thioglycolate) | 1.28 | 40 |
| | Clacium carbonate-calcium petroleum sulfonate | 0.20 | |
| | Stannous 2-ethylhexoate | 0.02 | |

* Modified with 1.5% 3-mercaptopropionic acid (See U. S. 3,507,827).

TABLE IV

| Time at 400°F (Minutes) | Controls: A | B | C | D | E | F | Examples: Stabil. Compos. | 35 8 | 36 9 | 37 10 | 38 12 | 39 13 | 40 14 |
|---|---|---|---|---|---|---|---|---|---|---|---|---|---|
| 0  | w   | w   | lpk | pk | w  | w  | | w   | w   | w   | w   | w   | w   |
| 5  | py  | vpy | b   | ch | bl | b  | | w   | vpy | w   | w   | w   | w   |
| 10 | y   | py  | b   | ch | bl | ch | | py  | vpy | vpy | vpy | vpy | vpy |
| 15 | lo* | y   | b   | ch | bl | ch | | py  | py  | py  | py  | py  | vpy |
| 20 | o   | lo* | b   | ch | bl | ch | | py  | y   | y   | y   | y   | py  |
| 25 | lb  | o   | b   | ch | bl | ch | | lb  | lb  | lb  | lb  | lb  | y   |
| 30 | b   | b   | b   | ch | bl | ch | | b   | lb  | b   | lb  | lb  | lb  |
| 35 | b   | b   | b   | ch | bl | ch | | b   | b   | b   | b   | b   | b   |
| 40 | b   | b   | b   | ch | bl | ch | | b   | b   | b   | b   | b   | b   |

The results of Table IV clearly indicate that the organotin-carbonate-organic salt stabilizer compositions of Examples 35–40 provide better performance than the organotin controls A and B, or the carbonate-organic salt combination controls C, D, and F, both with and without an added stannous salt. The stannous salt has no stabilizing effectiveness alone or combined with only the liquid carbonate-organic salt combination.

EXAMPLE 41

The same formulation and testing procedure as in the proceding examples is applied for the resin composition used in Table V, where the appearance of the test samples is set out.

The controls are:

| | | Parts |
|---|---|---|
| A: | Di-n-octyltin di(isooctyl thioglycolate) | 1.5 |
| B: | Calcium carbonate-calcium dodecyl thiobisphenate | 1.5 |

The stabilizer composition is:

| | | Parts | Examples |
|---|---|---|---|
| 11. | Di-n-octyltin di(isooctyl thioglycolate) | 1.25 | 41 |
| | Calcium carbonate-calcium dodecyl thiobisphenate | 0.25 | |

TABLE V

| Time at 400°F. (Minutes) | Controls: A | B | Examples: Stabil. Compos. 41 / 11 |
|---|---|---|---|
| 0 | w | lpk | w |
| 5 | py | b | vpy |
| 10 | y | b | vpy |
| 15 | lo↑ | b | y |
| 20 | lb | b | lb |
| 25 | b | b | lb |
| 30 | ch↑ | b | b |
| 35 | ch | b | b |
| 40 | ch | b | ch |

The results show that the stabilizer composition of Example 41 where the organotin is an n-octyltin compound provides greater stabilizing effectiveness than either of its individual components.

EXAMPLES 42 and 43

The resin compositions are formulated, prepared and tested as in the preceding examples. The appearance of the test samples is set out in Table VI.

The controls are:

| | | Parts |
|---|---|---|
| A | Dibutyltin di(isooctyl 3-mercaptopropionate) | 1.5 |
| B: | Dimethyltin di(isooctyl thioglycolate) | 1.5 |
| C: | Calcium carbonate-calcium dodecyl thiobisphenate | 1.5 |

The stabilizer compositions are:

| | | Parts | Examples |
|---|---|---|---|
| 15. | Dibutyltin di(isooctyl 3-mercaptopropionate) | 1.25 | 42 |
| | Calcium carbonate-calcium dodecyl thiobisphenate | 0.25 | |
| 16. | Dimethyltin di(isooctyl thioglycolate) | 1.25 | 43 |
| | Calcium carbonate-calcium dodecyl thiobisphenate | 0.25 | |

TABLE VI

| Time at 400°F. (Minutes) | Controls: A | B | C | Examples: Stabil. Compos. 42 / 15 | 43 / 16 |
|---|---|---|---|---|---|
| 0 | w | w | lpk | w | w |
| 5 | py | vpy | b | w | w |
| 10 | py | py | b | vpy | w |
| 15 | y | y | b | py | vpy |
| 20 | y* | y | b | y | py |
| 25 | o | o | b | o | lo |
| 30 | b | rb | b | lb | rb |
| 35 | b | b | b | lb | b |
| 40 | b | b | b | lb | b |

Again the results clearly demonstrate that surprising synergistic enhancement of stabilizing effectiveness through interaction of the organotin and liquid carbonateorganic salt combinations is obtained with a dimethyltin mercaptocarboxylic acid exter and a dialkyltin mercaptopropionate ester compound as the two organotin components of the stabilizer compositions.

EXAMPLE 44

The resin composition is prepared and tested as described above, the formulation is:

| Ingredients | Parts By Weight |
|---|---|
| Polyvinyl chloride homopolymer (Geon 103 Ep, K=55) | 100 |
| Arcylonitrile-butadiene-styrene copolymer (Blendex 401) | 10 |

| Ingredients | Parts By Weight |
|---|---|
| Titanium dioxide | 1.5 |
| Calcium stearate | 0.75 |
| Stabilizer composition 17 (from Table I) | 1.5 |

The appearance of the samples is given in Table VII. The controls employed are:

| | | Parts |
|---|---|---|
| A: | Mono-di-n-butyltin isooctyl thioglycolate sulfide | 1.5 |
| B: | Calcium carbonate-calcium dodecyl thiobisphenate | 1.5 |

The stabilizer composition is:

| | | Parts | Example |
|---|---|---|---|
| 17. | Mono-di-n-butyltin isooctyl thioglycolate sulfide | 1.25 | 44 |
| | Calcium carbonate-calcium dodecyl thiobisphenate | 0.25 | |

TABLE VII

| Time at 400°F. (Minutes) | Controls: A | B | Examples: Stabil. Compos. 44 / 17 |
|---|---|---|---|
| 0 | w | lpk | w |
| 5 | vpy | b | w |
| 10 | py | b | vpy |
| 15 | py | b | vpy |
| 20 | py | b | py |
| 25 | y | b | py |
| 30 | lt | b | y |
| 35 | lt | b | lt |
| 40 | lt | b | lt |

The results show the surprising synergistic enhancement of stabilizing effectiveness obtained when alkyltin mercaptocarboxylic acid ester sulfide is combined with a liquid carbonate-organic salt combination in a stabilizer composition more effective than either of its components alone.

EXAMPLE 45

The resin composition is prepared and tested as described above. It is formulated as follows:

| Ingredients | Parts By Weight |
| --- | --- |
| Polyvinyl chloride homopolymer (SM 200) | 100 |
| Methyl methacrylate-ethylacrylate copolymer (K 120N) | 2 |
| Titanium dioxide | 2 |
| Butylene glycol ester of montan wax acid (Wax E) | 0.25 |
| Stabilizer composition 18 (from Table I) | 1.8 |

The appearance of the samples is shown in Table VIII.

The controls are:

| | | Parts |
| --- | --- | --- |
| A: | Organotin combination of mono-n-butyl- and di-n-butyltin isooctyl thioglycolate (ratio 5:2) | 1.8 |
| B: | Organotin combination of mono-n-butyl-and di-n-butyltin isooctyl thioglycolate (ratio 5:2) | 1.35 |
| C: | Solid calcium carbonate 0.45 + the organotin combination 1.35 | 1.8 |
| D: | Solid calcium carbonate 1.0 + the organotin combination 1.35 | 2.35 |
| E: | Calcium carbonate-calcium dodecylthiobisphenate | 1.8 |

The stabilizer composition is:

| | | Parts | Example |
| --- | --- | --- | --- |
| 18. | Mono-n-butyltin tris(isooctyl thioglycolate) | 0.90 | |
| | Di-n-butyltin di(isooctyl thioglycolate) | 0.36 | 45 |
| | Calcium carbonate-calcium dodecyl thiobisphenate | 0.54 | |

TABLE VIII

| Time at 400°F. (Minutes) | A | Controls: B | C | D | E | Examples: Stabil. Compos. | 45 18 |
| --- | --- | --- | --- | --- | --- | --- | --- |
| 0 | w | w | w | vppk | lpk | | w |
| 5 | vpy | vpy | vpy | vpy | b | | w |
| 10 | vpy | vpy | vpy | vpy | b | | w |
| 15 | py | y | y | y | b | | vpy |
| 20 | y | lg | lg | lg | b | | py |
| 25 | g | g | g | g | g | | lg |
| 30 | g | g | g | g | b | | g |
| 35 | g↑ | g↑ | g↑ | g↑ | ch | | g |
| 40 | g↑ | g↑ | g↑ | g↑ | ch | | g |

The results clearly show that synergistic enhancement of stabilizing effectiveness is obtained by combining a mixed monoalkyl-dialkyltin mercaptocarboxylic acid ester with a liquid carbonate-organic salt combination in a stabilizer combination more effective than either component alone in the same weight concentration. When a solid calcium carbonate is used instead of the liquid calcium carbonate-organic salt combination there is no synergistic enhancement of stabilizing effectiveness. In fact, there is no improvement of stabilizing effectivensss of a given quantity of organotin (control B) by adding solid calcium carbonate in either of two concentrations (controls C and D).

EXAMPLES 46-47

The resin compositions are prepared and tested in the usual manner; the formulation is:

| Ingredients | Parts By Weight |
| --- | --- |
| Polyvinyl chloride homopolymer (K = 65) | 100 |
| Acrylonitrile-butadiene-styrene copolymer (Blendex 401) | 10 |
| Titanium dioxide | 2 |
| Calcium stearate | 1 |
| Stabilizer compositions 19 and 20 (from Table I) | 1.5 |

The appearance of the samples is described in Table IX.

The controls are:

| | | Parts |
| --- | --- | --- |
| A: | Combination of dibutyltin di(isooctyl thioglycolate) and zinc 2-ethylhexoate (ratio 99:1) | 1.5 |
| B: | Calcium carbonate-calcium dodecyl thiobisphenate | 1.5 |
| C: | Combination of dibutyltin di(isooctyl thioglycolate) + dibutyltin oxide in dioctyl phthalate (ratio 9:1) | 1.5 |

The stabilizer compositions are:

| | | Parts | Example |
| --- | --- | --- | --- |
| 19. | Di-n-butyltin di(isooctyl thioglycolate) | 1.238 | |
| | Zinc 2-ethylhexoate | 0.012 | 46 |
| | Calcium carbonate-calcium dodecyl thiobisphenate | 0.25 | |
| 20. | Di-n-butyltin di(isooctyl thioglycolate) | 1.125 | |
| | Di-n-butyltin oxide-dioctylphthalate complex: | 0.125 | 47 |
| | Calcium carbonate-calcium dodecyl thiobisphenate | 0.25 | |

TABLE IX

| Time at 400°F. (minutes) | A | B | C | Examples: Stabil. Compos. | 46 19 | 47 20 |
| --- | --- | --- | --- | --- | --- | --- |
| 0 | w | lpk | w | | w | w |
| 5 | vpy | lpu | vpy | | w | w |
| 10 | vpy | b | py | | w | vpy |
| 15 | py | b | y | | vpy | py |
| 20 | y | b | y* | | y | y |
| 25 | lb | b | lb | | lb | lb |
| 30 | lb | b | b | | lb | lb |
| 35 | b | b | b | | b | b |
| 40 | b | b | b | | b | b |

It follows from these results that synergistic enhancement of stabilizing effectiveness is obtained by combining an organotin stabilizer (made up of organotin mercaptocarboxylic acid ester and added diorganotin oxide-ester complex or added polyvalent metal carboxylate) with a carbonate and organic salt combination in a stabilizer composition which is more effective than either the organotin component or the carbonate-organic salt combination alone.

In order to demonstrate the effectiveness of the invention in a plastisol formulation, the following experiment is carried out.

EXAMPLE 48

Dispersion grade PVC is stirred with di-2-ethylhexyl phthalate plasticizer and stabilizer at room temperature using an electric hand drill fitted with a propeller type stirrer. The resulting milky dispersions are freed of contact air in an evacuated desicator overnight, poured on glass plates and fused in a circulating air oven at 400° F. for 3 minutes. The resulting clear sheet which is 0.5 mm. thick is cut in strips, which are aged in the oven at 400° F. for the indicated time. Samples are withdrawn at 5 minute intervals and examined for color changes as evidence of degradation.

The formulation is:

| Ingredients | Parts By Weight |
| --- | --- |
| Dispersion grade PVC (Blacar 1716, product of Tenneco Chemicals Inc.) | 100 |
| Di-2-ethylhexyl phthalate | 65 |
| Stabilizer composition 18 (from Table I) | 2 |

The appearance of the samples is described in Table X.

The controls are:

| | | Parts |
| --- | --- | --- |
| A: | Di-n-butyltin bis(isooctyl thioglycolate) (18.6% tin) | 2.0 |
| B: | Calcium carbonate-calcium dodecyl thio-bisphenate | 2.0 |

The stabilizer composition (11.3% tin) is:

| | | Parts | Example |
| --- | --- | --- | --- |
| 18. | Mono-n-butyltin tris(isooctyl thioglycolate) | 1.0 | 48 |
| | Di-n-butyltin di(isooctyl thioglycolate) | 0.4 | |
| | Calcium carbonate-calcium dodecyl thio-bisphenate | 0.6 | |

TABLE X

| Time at 400°F. (Minutes) | Controls: A | B | Examples: Stabil. Compos. | 48 18 |
| --- | --- | --- | --- | --- |
| 0 | c | lpk | | c |
| 5 | c | lr | | c |
| 10 | vpy | dr | | c |
| 15 | vpy-b** | b | | vpy |
| 20 | py-b** | b | | vpy |
| 25 | y-b** | b | | py |
| 30 | lb*** | b | | lb |
| 35 | b | b | | b |
| 40 | b | b | | b |

The results show surprising synergistic enhancement of stabilizing effectiveness by the 11.3 percent tin composition of an organotin stabilizer with a liquid carbonate-organic salt combination as compared to either an equal weight of an 18.6 percent tin organotin stabilizer alone, or an equal weight of carbonate-organic salt combination alone.

EXAMPLE 49

Plasticized calendering resin compositions are prepared having the following:

| Ingredients | Parts By Weight |
| --- | --- |
| Polyvinyl chloride homopolymer (K = 68) | 100 |
| Di-2-ethylhexyl phthalate | 40 |
| Epoxy soybean oil | 5 |
| Montan wax acid butylene glycol diester (Wax E) | 0.25 |
| Stabilizer | 1.0 |

The procedure in preparing and testing the samples for heat stability at 400° F. was the same as in preceding examples. The appearance of the samples is reported in Table XI which follows:

The controls are:

| | | Parts |
| --- | --- | --- |
| A: | Di-n-butyltin di(isooctyl thioglycolate) | 1.0 |
| B: | Calcium carbonate-calcium dodecyl thio-bisphenate | 1.0 |

The stabilizer composition (11.3 percent tin) is:

| | | Parts | Example |
| --- | --- | --- | --- |
| 18 | Di-n-butyltin di(isooctyl thioglycolate) | 0.2 | 49 |
| | Mono-n-butyltin tris(isooctyl thioglycolate) | 0.5 | |
| | Calcium carbonate-calcium dodecyl thio-bisphenate | 0.3 | |

TABLE XI

| Time at 400°F. (Minutes) | Controls: A | B | Example: Stabil. Compos. | 49 18 |
| --- | --- | --- | --- | --- |
| 0 | c | pk | | c |
| 5 | vpy | lr | | c |
| 10 | py | dr | | vpy |
| 15 | py | b | | py |
| 20 | y | b | | y |
| 25 | y | b | | y |
| 30 | a | b | | y |
| 35 | o | b | | y |
| 40 | do | b | | a |

The results show that when used in equal weight concentration, the stabilizer composition combining the monobutyl and dibutyltin isooctyl thioglycolate with the liquid calcium carbonate-organic salt combination inhibits discoloration of the plasticized PVC for approximately twice as long as dibutyltin bis(isooctyl thioglycolate) which contains almost twice as much tin (18.6 percent against 11.3 percent) and which was long considered the most powerful stabilizer known. Thus 10 minutes heating of the composition of Example 49 gives the same color reached by Control A in 5 minutes, thus providing a doubling of the heat stability afforded by control A. The calcium carbonate-calcium dodecyl thiobisphenate by itself has little or no stabilizing effectiveness. This makes the synergistically enhanced stabilizing effectiveness of the combination in the same total amount unexpected.

EXAMPLE 50

In order to show the effectiveness of stabilizer compositions of this invention under dynamic conditions where the plastic mass is subjected to mechanical shear in addition to the influence of heat and air, mill stability tests are carried out. A double laboratory batch of each PVC composition (200 grams of PVC and all other ingredients in proportion) is prepared and fused on a two-roll mill. The fused stock is kept on the mill at 358° F. until failure (severe color development or sticking to the roll) is observed. At 5 min. intervals, the stock temperature is measured with a pyrometer and a small sample is removed, flattened with molding pliers and attached to a record card.

The formulation is:

| Ingredients | Parts By Weight |
| --- | --- |
| Polyvinyl chloride (high mol K=68) | 100 |
| Methyl methacrylate-ethylacrylate copolymer K-120N) | 1.0 |
| Titanium dioxide | 1.0 |
| Paraffin wax (Aristo Wax 160) | 1.0 |
| Calcium stearate | 0.8 |
| Stabilizer composition 18 (from Table I) | 0.5 |

The appearance of the samples and stock temperatures are reported in Table XII which follows.
The control is: (18.6 percent tin)

| | Parts |
| --- | --- |
| Di-n-butyltin di(isooctyl thioglycolate) | 0.5 |

The stabilizer composition (11.3 percent tin) (from Table I) is:

| | | Parts Example 50 |
| --- | --- | --- |
| 18. | Mono-n-butyltin tris(isooctyl thioglycolate) | 0.25 |
| | Di-n-butyltin di(isooctyl thioglycolate) | 0.10 |
| | Calcium carbonate-calcium dodecyl thiobisphenate | 0.15 |

MILL STABILITY AT 358° ± 2°F. of the mill, Stock Temperature ° F. is given in parentheses.

TABLE XII

| Time at 358°F. (Minutes) | Control: A | Example: Stabil. Compos. 18 |
| --- | --- | --- |
| 0 | w (360) | w (356) |
| 5 | vpy (360) | w (358) |
| 10 | vpy (360) | w (358) |
| 15 | py (358) | w-vpy (360) |
| 20 | py (360) | vpy (360) |
| 25 | y (358) | py (360) |
| 30 | lo (360) | y (360) |
| 35 | o (365) | lo (360) |
| 40 | lo-b (370) | lo (358) |
| 45 | lb (376) | lo (356) |
| 50 | lb (376) | lo (356) |
| 55 | lb (383) | lo (358) |
| 60 | lb (390) | lo (356) |
| 65 | b (392) | lo (360) |
| 70 | b (394) | lt (363) |
| 75 | b (396) | lb (369) |
| 80 | db (396) | lb (372) |

The results show that the stabilizing effectiveness of the stabilizer compositions of this invention is considerably greater than that of a known effective commercial organotin stabilizer used in the same weight concentration and having a much greater tin content, under the stringent dynamic test conditions of the mill stability test. The correlation seen here between oven and mill stability tests shows that the results of the oven test can be utilized for gauging the usefulness of the stabilizer compositions for processes carried out under mechanical shear, such as extrusion and calendering. The lower stock temperatures observed with the stabilizer composition of this invention while keeping the mill at 358° ± 2° F. indicate the additional and unexpected desirable property of minimizing the "frictional heat build-up" in the plastic stock.

The stabilizer compositions of this invention are advantageously used in resins formed into many useful structural members including extruded polyvinyl chloride pipe useful for water, brine, crude petroleum, gasoline, natural and manufactured fuel gas, and domestic and industrial wastes; flat and corrugated profilel for the construction industry, and blow-molded bottles.

Having regard to the foregoing disclosure, the following is claimed as the inventive and patentable embodiments thereof:

1. A homogeneous stabilizer composition, liquid at ambient temperature, for increasing resistance to early discoloration of polyvinyl chloride resins heated to 400° F. comprising:

(a) at least one organotin mercaptocarboxylic acid ester having a tetravalent tin atom linked directly to carbon and to sulfur and from one to two hydrocarbon groups of 1–18 carbons linked each to tin, the mercaptocarboxylic acid ester group being linked to tin through sulfur, (b) at least one alkaline earth metal carbonate selected from the class consisting of calcium and magnesium, and (c) at least one of an organic calcium and magnesium salt, of an aromatic acid containing sulfur selected from the group consisting of aryl sulfonic acids, alkaryl sulfonic acids and sulfurized alkyl phenates and having at least 20 carbon atoms and acting as a liquifier for the carbonate;

wherein the weight ratio of the organotin mercaptocarboxylic acid ester to the combined alkaline earth metal carbonate organic calcium or magnesium salt components is within the range of from about 1:1 to 25.1 and the ratio of the number of alkaline earth metal equivalents to the number of equivalents of the organic acid residue of the organic calcium or magnesium salt is greater than two.

2. A process for preparing a storage stable polyvinyl chloride stabilizer composition comprising mixing for about 1 hour to about 4 hours at ambient temperature to about 300° F. until visual homogeneity is obtained:

a. at least one organotin mercaptocarboxylic acid ester having a tetravalent tin atom liked directly to carbon and to sulfur and from one to two hydrocarbon groups of 1–18 carbons linked to tin, the mercaptocarboxylic acid ester group being linked to tin through sulfur, b. at least one alkaline earth metal carbonate selected from the class consisting of calcium and magnesium, and c. at least one of an organic calcium and magnesium salt, of an aromatic acid containing sulfur selected from the group consisting of aryl sulfonic acids, alkaryl sulfonic acids and sulfurized alkyl phenates and having at least 20 carbon atoms and acting as a liquifier for the carbonate;

wherein the weight ratio of the organotin mercaptocarboxylic acid ester to the combined alkaline earth metal carbonate organic calcium or magnesium salt components is within the range of from about 1:1 to 25:1 and the ratio of the number of alkaline earth metal equivalents to the number of equivalents of the organic acid residue of the organic calcium or magnesium salt is greater than two.

3. A process for preparing a storage stable PVC stabilizer composition according to claim 2 wherein di-n-butyltin diisooctyl thioglycolate and calcium carbonate-calcium dodecyl thiobisphenate are heated until visual homogeneity is obtained.

4. A process for preparing a storage stable stabilizer composition according to claim 2 wherein mono-n-butyltin tris(isooctyl thioglycolate) and magnesium carbonate-magnesium petroleum sulfonate are heated until visual homogeneity is obtained.

5. A process for preparing a storage stable stabilizer composition according to claim 2 wherein di-n-octyltin di(isooctyl thioglycoate) and calcium carbonate-calcium dodecyl thiobisphenate are mixed until visual homogeneity is obtained.

6. A stabilizer composition according to claim 1 where the organotin mercaptocarboxylic acid ester has the formula:

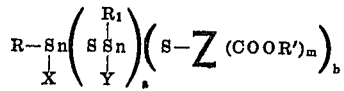

where
$a$ is an integer from zero to five
$b$ is an integer from one to two
$m$ is an integer from one to two
R and $R_1$ are hydrocarbon radicals linked to tin through carbon having from one to about 18 carbon atoms and preferably from one to eight carbon atoms
R' is an organic group derived from a monohydric or polyhydric alcohol of the formula $R'(OH)_n$ where $n$ is an integer from one to about four
X is selected from sulfide sulfur, R, $R_1$, and $S Z (COOR')_m$ and Y is selected from R and $S Z (COOR')_m$ is a bivalent alkylene radical carrying the S group in a position alpha or beta to COOR' group, and may contain additional free carboxylic acid, carboxylic acid ester, or carboxylic acid salt groups, and mercapto groups, the radical has from one to about five carbon atoms.

7. A stabilizer composition according to claim 1 wherein the hydrocarbon group of organotin mercaptocarboxylic acid ester linked to tin through carbon is n-butyl.

8. A stabilizer composition in accordance with claim 1 in which the hydrocarbon group of the organotin mercaptocarboxylic acid ester linked to tin through a carbon is n-octyl.

9. A stabilizer composition in accordance with claim 1 wherein the hydrocarbon group of the organotin mercaptocarboxylic acid ester linked to tin through carbon is methyl.

10. A stabilizer composition in accordance with claim 1 wherein the organotin mercaptocarboxylic acid ester is a thioglycolate ester.

11. A stabilizer composition in accordance with claim 1 in which the organotin mercaptocarboxylic acid ester is a 3-mercaptopropionate ester.

12. A stabilizer composition according to claim 1 wherein the organotin mercaptocarboxylic acid ester is an organotin mercaptocarboxylic acid ester sulfide.

13. A stabilizer composition according to claim 1 wherein the organotin mercaptocarboxylic acid ester is a dimethyltin mercaptocarboxylic acid ester.

14. A stabilizer composition according to claim 1 wherein the organotin mercaptocarboxylic acid ester is di-n-octyltin di(isooctyl thioglycolate).

15. A stabilizer composition according to claim 1 wherein the organotin mercaptocarboxylic acid ester is selected from the class consisting of di-n-butyltin di(isooctyl thioglycolate), mono-n-butyltin tris(isooctyl thioglycolate), and combinations thereof.

16. A stabilizer composition according to claim 11 wherein the organotin mercaptocarboxylic acid ester is n-butyltin isooctyl thioglycolate sulfide.

17. A stabilizer composition in accordance with claim 1 wherein the organic salt is a salt of a sulfonic acid.

18. A stabilizer composition according to claim 17 wherein the organic salt is a polydodecyl benzene sulfonate.

19. A stabilizer composition in accordance with claim 1 wherein the organic salt is a salt of a dodecyl thiobisphenol.

20. A stabilizer composition in accordance with claim 1 in which the organic salt is a mixed salt or combination of salts derived from at least two organic acids.

21. A stabilizer composition according to claim 1 including at least one auxiliary stabilizer selected from the class of hindered phenols, organic phosphites, organic sulfides, zinc and stannous salts of carboxylic acids having from seven to 24 carbon atoms, dialkyltin sulfide and di-alkyltin oxide complexes with organic esters.

22. A stabilizer composition in accordance with claim 21 wherein the auxiliary stabilizer is di-n-butyltin oxide-organic ester complex.

23. A polyvinyl chloride resin composition having an enhanced resistance to early discoloration when heated to 400° F. comprising a polyvinyl chloride resin and a stabilizer composition in accordance with claim 1 in a weight ratio from 0.1 to 5 parts of stabilizer composition to 100 parts of resin.

24. A polyvinyl chloride resin composition having an enhanced resistance to early discoloration when heated to 400° F. comprising a polyvinyl chloride resin and a stabilizer composition in accordance with claim 10.

25. A polyvinyl chloride resin composition comprising a polyvinyl chloride resin and a stabilizer composition in accordance with claim 11.

26. A polyvinyl chloride resin composition comprising a polyvinyl chloride resin and a stabilizer composition in accordance with claim 12.

27. A polyvinyl chloride resin composition comprising a polyvinyl chloride resin and a stabilizer composition in accordance with claim 17.

28. A polyvinyl chloride resin composition comprising a polyvinyl chloride resin and a stabilizer composition in accordance with claim 21.

29. A polyvinyl chloride resin composition comprising a polyvinyl chloride resin, a stabilizer composition according to claim 1, and a lubricant selected from the class of calcium stearate, paraffin wax, petrolatum, and ester waxes.

30. A polyvinyl chloride resin composition comprising a polyvinyl chloride resin, a stabilizer composition in accordance with claim 1, and a polymeric modifier, for improving the toughness or impact resistance of unplasticized resins.

* * * * *